Nov. 2, 1965  R. W. WRIGHT ETAL  3,214,790
POST-INFLATING MACHINE FOR TIRES
Original Filed Dec. 10, 1959
6 Sheets-Sheet 1
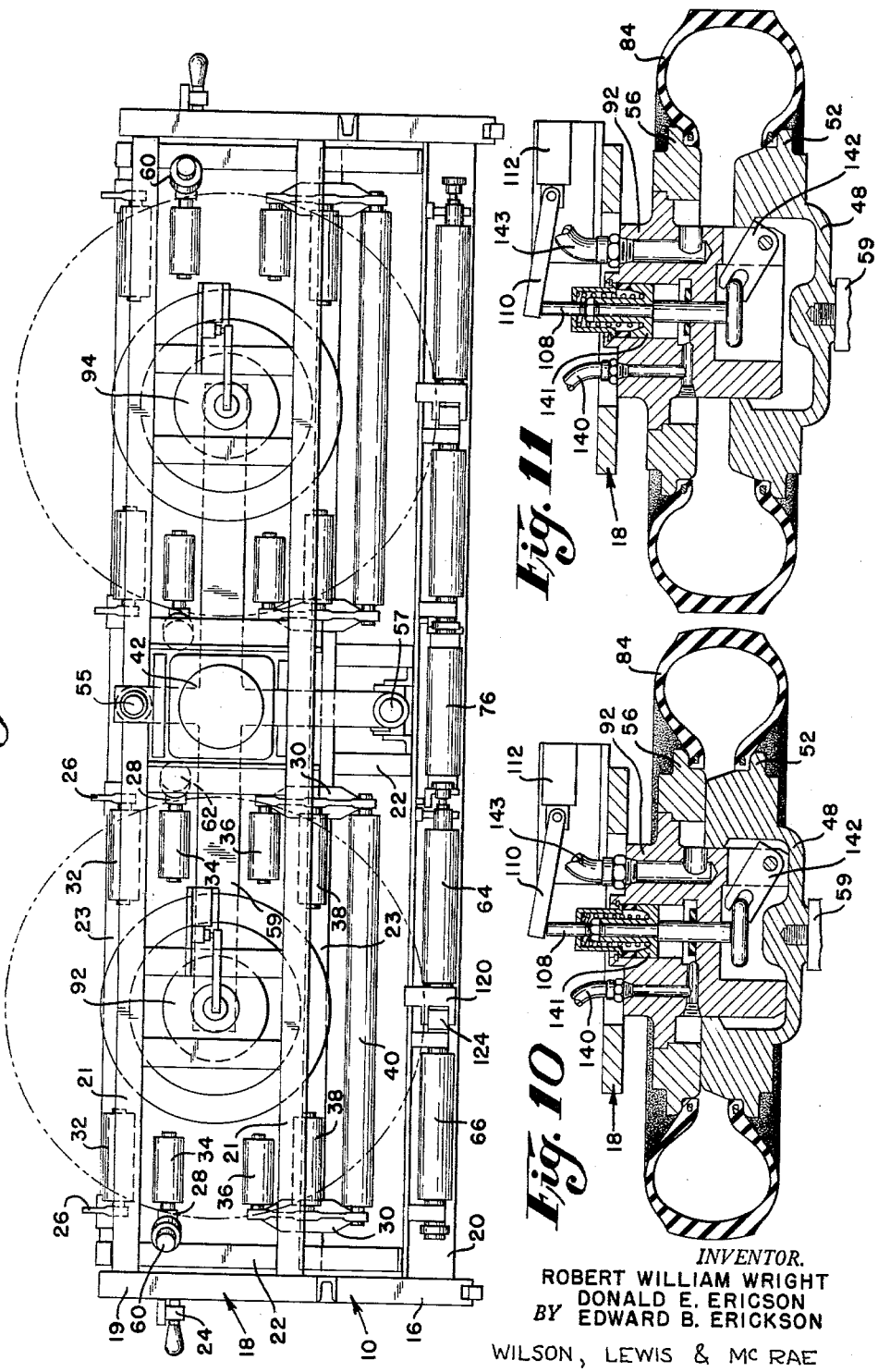
INVENTOR.
ROBERT WILLIAM WRIGHT
DONALD E. ERICSON
BY EDWARD B. ERICKSON
WILSON, LEWIS & McRAE

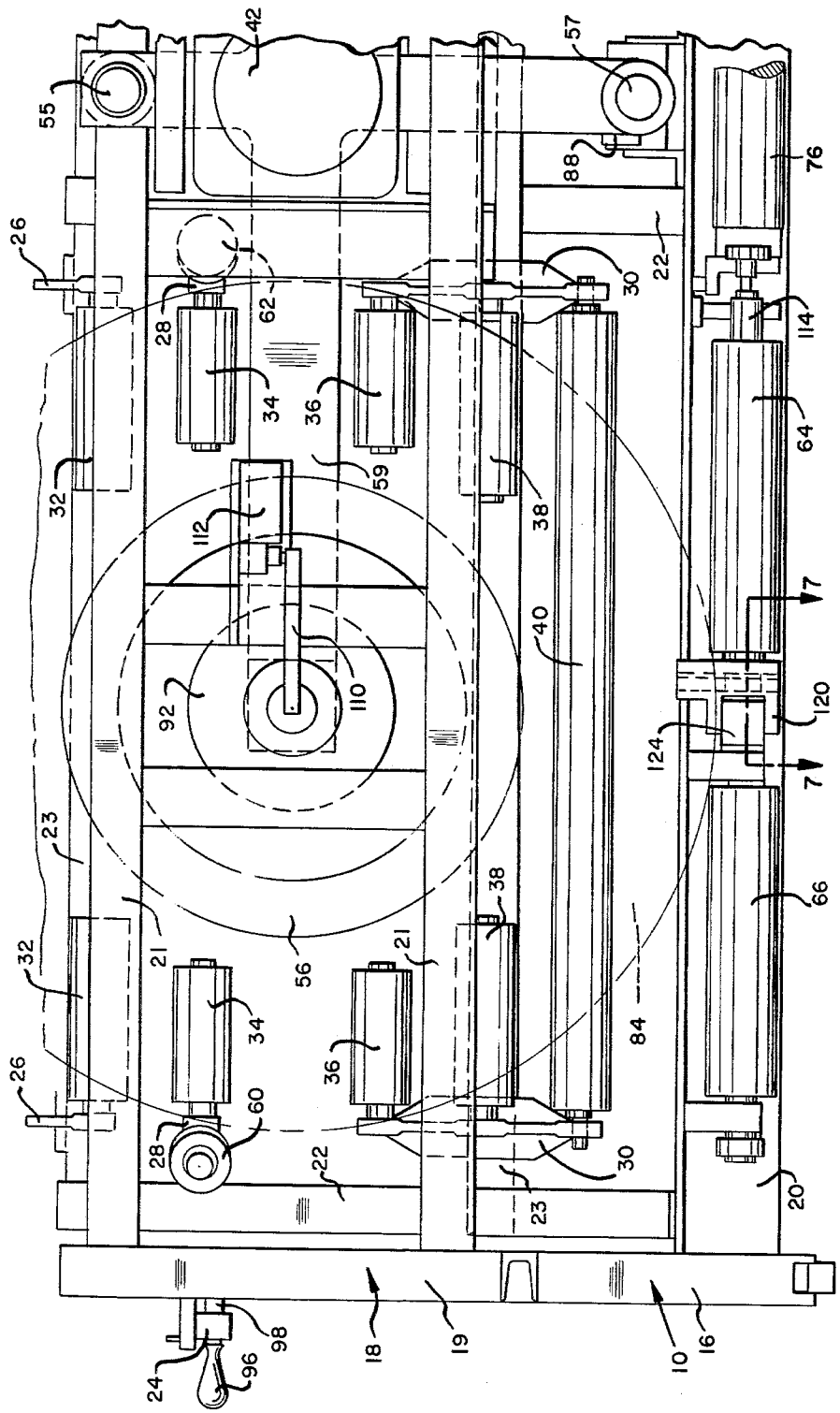

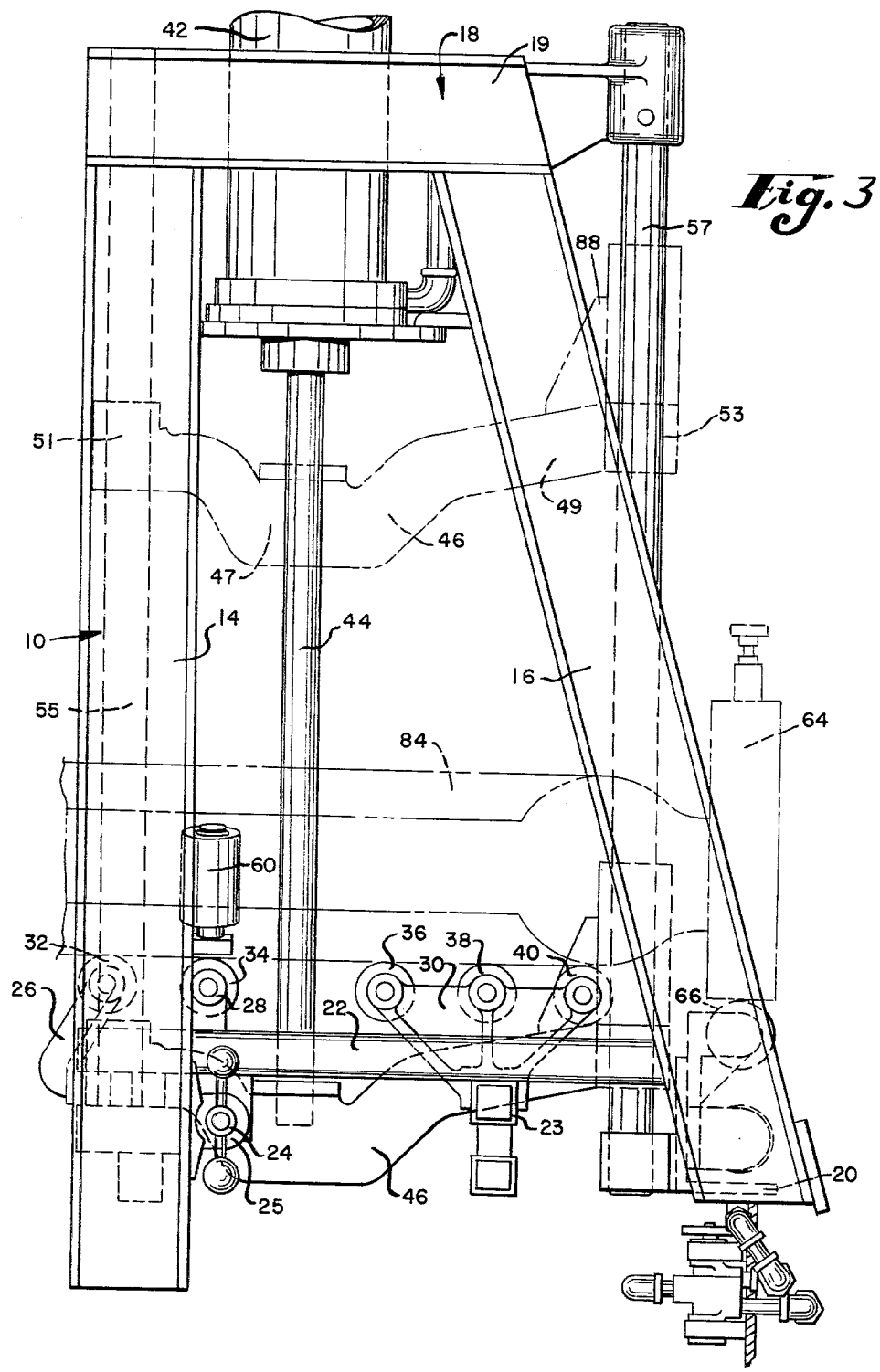

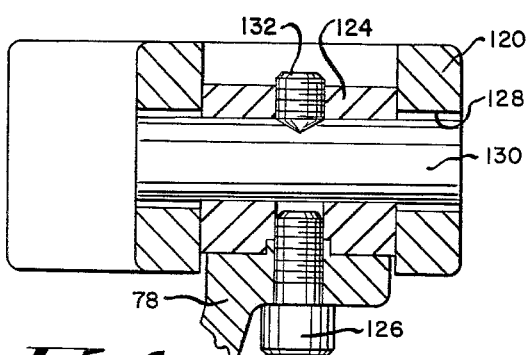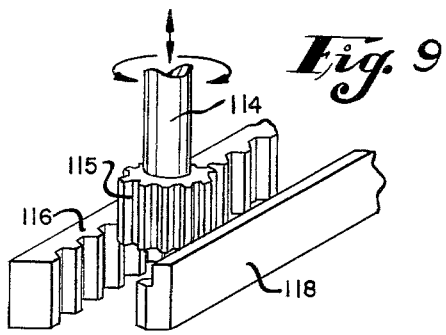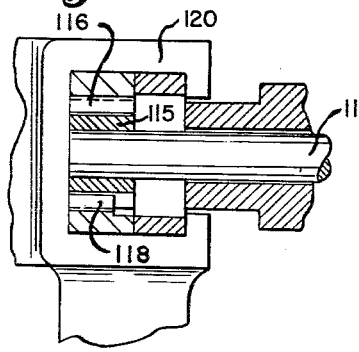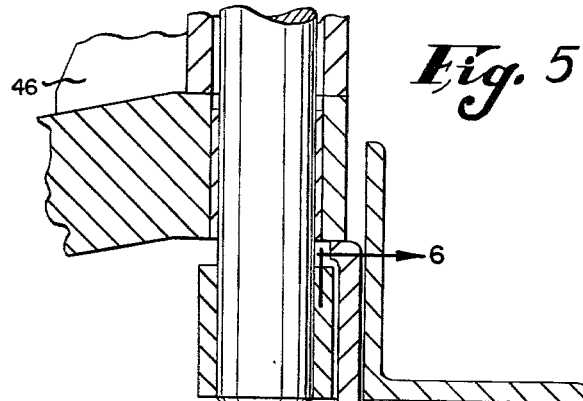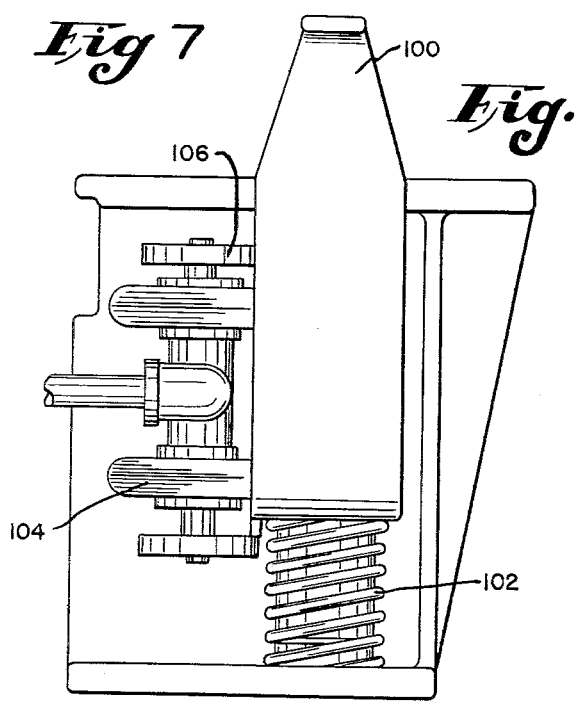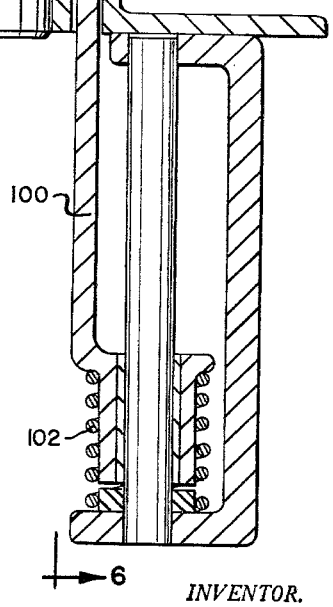
INVENTOR.
ROBERT WILLIAM WRIGHT
BY DONALD E. ERICSON
EDWARD B. ERICKSON
WILSON, LEWIS & McRAE United States Patent Office 3,214,790
Patented Nov. 2, 1965

3,214,790
POST-INFLATING MACHINE FOR TIRES
Robert William Wright, Detroit, and Donald E. Ericson, Farmington, Mich., and Edward B. Erickson, Clearwater, Fla., assignors of one-half to Firwood Manufacturing Company, Dearborn, Mich., and one-half to United States Rubber Company, New York, N.Y.
Continuation of application Ser. No. 858,775, Dec. 10, 1939. This application Apr. 5, 1963, Ser. No. 270,962
3 Claims. (Cl. 18—2)

This invention relates to devices used in the post-inflation of tires. Post-inflation is a process in which tires are inflated immediately after molding and held inflated to cool the tire while the tire cords are in a stretched condition. This process minimizes tire growth when the tire is put into use. This is a continuation of our copending application Serial No. 858,775 filed December 10, 1959, now abandoned.

During normal usage of a tire, the cord forming a portion of the carcass has a tendency to stretch. This is particularly true with respect to nylon cord, and to a somewhat lesser degree with respect to other cord fabrics used in the formation of tire carcasses. Stretching of the fabric during use causes the formation of flat spots on the tire when the weight of the vehicle stands on the tire for an extended period. This situation is particularly aggravated in cold weather when flat spots stay in the tire longer. If a tire is post-inflated, the cords are allowed to stretch before the tire is put into use and the problem of flat spots is minimized.

An object of our invention is therefore to provide an improved machine for use in the post-inflation of tires wherein immediately after the tires are ejected from the mold they are inflated to substantially higher pressure than their normal operating pressures to stretch the cord to such a desired predetermined degree.

Still another object of our invention is to provide an improved post-inflating machine adapted for use in cooperation with the tire molding machine in such a manner that the tire may be automatically mounted and subjected to predetermined pressures quickly after being ejected from the molding machine to stretch the tire while it is still pliable due to the retention of heat therein, and to insure proper curing as the heat is dissipated from the tire.

Another object of our invention is to provide an improved automatically operable machine for use in the post-inflation of tires wherein tires ejected from the molding machine are automatically mounted and inflated to relatively high pressure, so that the cord may be stretched while in the heated condition and prior to losing its plasticity as the heat is dissipated from the tire during the curing cycle.

Still a further object of our invention is to provide an improved machine for the post-inflation of tires which is of rugged construction and which can be economically fabricated to insure rapid mounting and inflating of tires ejected from the molding machine before the heat embodied in the tire is dissipated.

Another object is to provide an improved machine for the post-inflation of tires which occupies little space and which is designed to permit workmen to have ready access to the molding and post-inflating machines to perform maintenance and repair functions.

Yet a further object of our invention is to provide an improved post-inflating machine adapted for use in conjunction with a tire molding machine and wherein the tire may be mounted and inflated to desired pressures to permit a portion of the curing cycle of the tire to occur on the post-inflating machine thereby speeding up the operation of the molding machine.

Another object of our invention is to provide an improved post-inflating machine wherein automatically operable side and front guide rollers are provided to direct a tire over a desired path of travel to an operative position with respect to a lower tire supporting ring, the tire ring automatically moving upwardly into engagement with an upper tire ring thereupon the rings are locked in operative relation and air is automatically introduced under desired pressure into the tire to stretch the tire to a desired degree as it cools.

Another object resides in the provision of a two-stage action of the tire ring members which provides for the proper seating of the beads to insure an air-tight contact before the ring members are locked in operative relation for post-inflation.

Another object resides in the provision of a safety construction to resist the tremendous forces exerted as the tire is inflated to a pressure above the normal operating pressure.

A further object of our invention is to provide an improved post-inflating machine for receiving tires from a molding machine and to provide adequate support for the tire as it is moved by the force of gravity and is guided by suitable rollers to an automatically operable chuck through which the tire may be subjected to predetermined air pressure to prestress the cords within the tire.

Still another object is to provide a post-inflating device for tires wherein a tire supporting and guide roller assembly can be pivoted to a non-obstructing position to permit ready access to the molding machine and post-inflating machine for maintenance and repair.

Other objects of this invention will appear in the following description and appended claims, reference being had to the accompanying drawings forming a part of this specification wherein like reference characters designate corresponding parts in the several views.

In the drawings:

FIGURE 1 is a plan view of the tire-supporting chuck members of a post-inflating machine embodying our invention;

FIGURE 1a is an enlarged plan view of one tire supporting chuck member of a post-inflating machine;

FIGURE 2 is a rear elevational view of the post-inflating machine disclosed in FIGURE 1a;

FIGURE 3 is an end elevational view of our improved post-inflating machine;

FIGURE 4 is a sectional view taken substantially on the line 4—4 of FIGURE 2 looking in the direction of the arrows;

FIGURE 5 is a sectional view taken substantially on the line 5—5 of FIGURE 2 looking in the direction of the arrows;

FIGURE 6 is a fragmentary elevational view taken substantially on the line 6—6 of FIGURE 5 looking in the direction of the arrows; and FIGURE 7 is a fragmentary sectional view taken substantially on the line 7—7 of FIGURE 1a looking in the direction of the arrows;

FIGURE 9 is a perspective view of the rack and pinion structure shown in FIGURE 7;

FIGURE 10 is a cross-sectional view of one tire-supporting chuck member showing the tire bead-engaging members in contact to insure the proper seating and sealing of the tire beads even in the event of collapsed beads; and FIGURE 11 is a similar view with the tire inflated to separate the bead-engaging members to the locked position.

Figure 2:
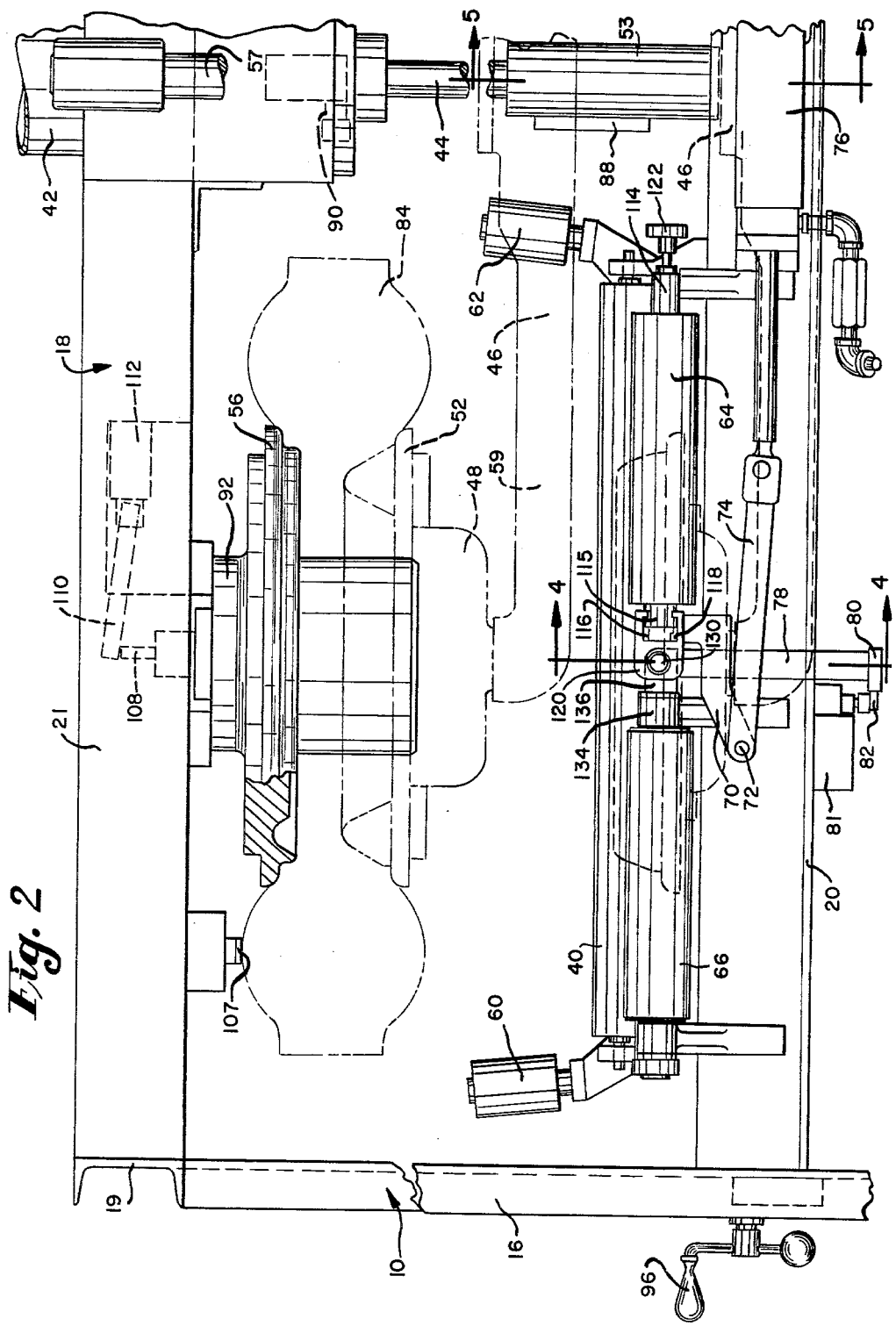

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation.

In the molding of tires it is common parctice to position two molding machines side by side to mold two tires simultaneously. Consequently, our improved post-inflating machine is adapted to receive two tires from the molding machine and is designed to operate in seqeunce with the molding machine by quickly receiving tires therefrom and inflating them to the desired pressure to prestress the cords as they cool on the post-inflating machine. While our machine is designed to simultaneously receive two tires, we have described only one side of the machine which receives one tire. It will be apparent that the other side of the machine is symmetrical with the side which has been shown.

Referring now more particularly to FIGURES 1a–3, and 8, it will be noted that our improved post-inflating machine for use in conjunction with the molding machines is designed in such a manner that ready access can be gained to the mechanism of the tire molding machine and to the control and actuating mechanism of the post-inflating machine to perform the necessary maintenance and repair functions.

Spaced end frames 10 (FIGURE 8) consist of substantially vertical channel members 14 at the front of the machine and slanting rear channel members 16 at the rear. The channel members 14 and 16 are connected together by upper support structure 18 having channel members 19 secured to the front and back channel members 14 and 16 and a pair of cross members 21 (FIGURE 1a) extending laterally between the end frame members 10. The vertical channel members 14 and 16 of the end frame members 10 provide a generally A-shaped end structure. Angle member 20 (FIGURES 1, 3) extends between and is secured to the lower ends of channel members 16.

A conveyor structure (FIGURES 1, 1a) having front to rear end frame members 22 and cross frame members 23 is pivotally mounted at 24 on brackets 25 secured to the front channel members 14. Secured to the conveyor frame members 22 and 23 are a plurality of brackets, such for example as 26, 28 and 30 supporting a plurality of pairs of spaced tire-supporting rollers 32, 34, 36 and 38 and an elongated roller 40 positioned adjacent the rear of the machine.

Figure 8:
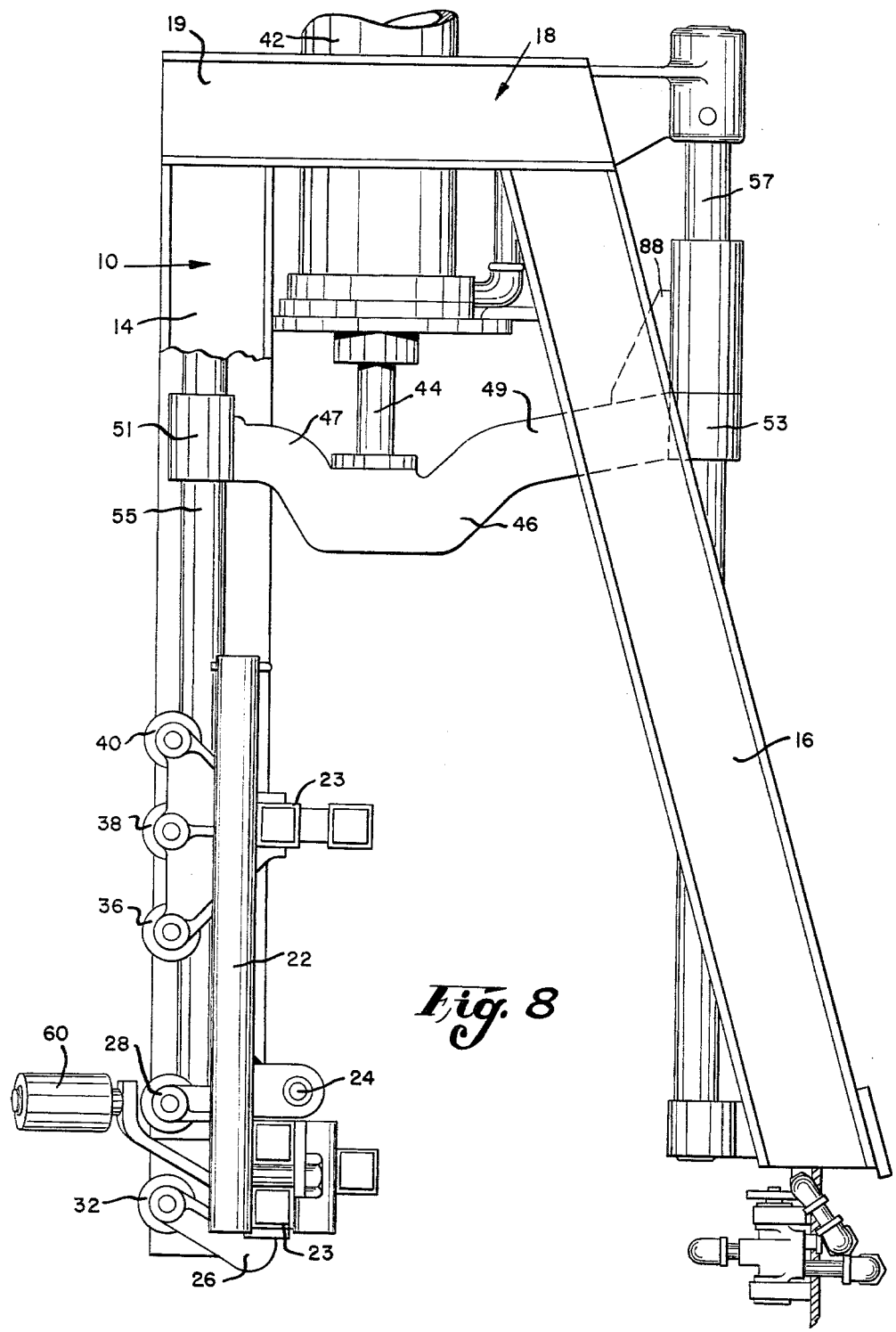
FIGURE 8 is an elevational view of the post-inflating machine with the lower portion of a leg removed to show the tire platform of the conveyor tipped up and lower chuck member raised out of the way to permit access of maintenance workers to the machine.

The platform formed by the frame members 22 and 23 with their associated brackets and rollers may be removable or may be rotated about the pivot point 24 and shifted from the horizontal operative position illustrated in FIGURE 1a to a vertical inoperative position as shown in FIGURE 8 substantially aligned with the channel members 14 thereby providing substantially uninterrupted space between front and rear channel members 14 and 16. The platform is light enough so that this operation may be accomplished manually. It will be understood that where the platform is removable suitable guide supports may be employed to accurately locate it in the operative position.

The upper structure 18 is formed of structural members welded together to provide a rugged and strong support interconnecting the A-shaped end frame members 10. Secured substantially at the mid-section of the upper member 18 is a power cylinder 42 (FIGURES 1, 3) having a piston rod 44 connected at its bottom to a yoke 46 having forwardly and rearwardly extending arms 47 and 49 (FIGURE 8) terminating in bosses 51 and 53 forming guides slidably mounted on vertically extended rods 55 and 57 secured in the end frames 10 as best illustrated in FIGURE 3. The yoke 46 has arms 59 (FIGURES 1, 1a, 2, 10, 11) extending laterally in opposite directions. The arms 59 support lower chuck halves or rings 48 (FIGURES 10, 11) having tire bead supporting rings 52 adapted to pick up tires from the pairs of rollers 32 to 40 and elevate the tires to engage upper tire ring 56 forming part of an upper chuck half, as best illustrated in FIGURE 2, carried by the upper frame member 18.

When the yoke 46 is in the elevated position as shown in FIGURE 8 and the frame members 22 and with their associated brackets and tire supporting rollers are pivoted to the vertical position, a relatively large and unobstructed space is provided into which a workman may freely move to perform the necessary repair and maintenance functions required to maintain the tire molding machine and this post-inflating machine in operation.

This improved post-inflating machine is positioned behind an automatic tire molding machine in such a position as to receive tires when they are ejected from the molding machine. The tires are guided into the front of the post-inflating machine by short upright rollers 60 and 62 (FIGURES 1, 2) associated with the pair of short tire supporting rollers 34 to position the tire laterally into alignment with the lower tire ring members 52 carried by the lower chuck ring members 48 secured to the yoke 46.

The horizontal member 20 interconnecting the rear ends of the A-shaped end frame members 10 is provided with a centrally disposed tire gate roller 64 carried by a pivoted support or clevis 120 opposite the center of each of the lower chuck members 48. Each of these rollers 64, as may be seen in FIGURE 2, is actuated by a lever 70 fixed to the clevis 120 and pivotally connected at 72 to a link 74 actuated by a double acting power cylinder 76 to pivot the rollers 64 from their horizontal position illustrated in full lines in FIGURE 2 to the vertical position shown in dotted lines in FIGURE 3 to act as a stop to center the tires over the lower tire ring 52.

As may be seen in FIGURES 2 and 9, the roller 64 is horizonally adjustable towards or away from the center of the lower tire ring 52 so that in its upright position it will accommodate tires having different diameters. The adjusting mechanism comprises an axailly shiftable shaft 114 which extends through the roller 64. The shaft carries a pinion gear 115 at one end which is normally locked between a pair of spaced rack gears 116, 118 mounted in a T-slot provided in a pivotal clevis 120. The clevis is rotatably mounted by means of a short shaft 136 journalled in a bearing carried by the member 134. The lower rack 118 is narrower than the upper rack 116 whereby when the rod and pinion gear are shifted, the pinion will engage the teeth of only the upper rack 116. Rotation of the rod by means of the knob 122 will then move the gear 115 and shaft 114 along the rack 116 and so move the roller 64 horizontally to the desired position. At this position the rod is shifted back to engage the pinion with both racks and lock the roller in place.

As shown in FIGURES 1a, 2, 4, an arm 78 is secured to a block 124 by means of a screw 126. The block 124 is pivotally mounted in the clevis 120 by means of a pin 130 which extends through the opening 128. The block 124 is adjustably fixed to the clevis by a set screw 132. The arm 78 extends through a slot in the member 20 and terminates at a point adjacent a switch 81 (FIGURE 2) which is adapted to energize a valve to activate the power cylinder 42 to raise the lower chuck when the tire is in place. The arm 78 carries a cam 80 on its lower end which is adapted to depress the switch arm 82 of the switch 81 when the tire has reached the roller 64. The necessary rocking of the arm 78 is accomplished by the impact of an incoming tire against the roller 64 which pivots the rotatable clevis 120 and attached arm 78 to the switch depressing position. The arm 78 is spring loaded to return to its initial position after impact. The extent of arm 78 rotation is limited by the size of the slot in the member 20 through which the arm projects.

When the cylinder 42 has thus been activated the piston rod 44 connected to the yoke 46 moves up, guided on the rods 55 and 57, whereupon the tire 84 is moved into engagement with the upper tire ring 56. The guide 53, which is secured to yoke 46 has secured thereto a cam 88 adapted to engage a switch arm 90 positioned at the lower end of the power cylinder 42 carried by the upper frame member 18 to actuate a locking mechanism carried by the upper chuck rings 92 and 94 and adapted to engage and securely lock the upper chuck rings 92 and 94 to the lower tire rings 52, when and only when the lower chuck member is in proper position, as will be explained.

When certain types of newly cured tires are ejected from the press, the bead members tend to move together in a substantially collapsed state. In this condition it is difficult to properly seat the beads against the flanges of tire ring members 52 and 56, as these members approach one another. To overcome this difficulty, means are provided for moving the tire ring members to the position shown in FIGURE 10 to engage the collapsed beads sufficient for them to form a seal capable of retaining air. When air pressure is admitted to the tire the tire ring members move outwardly away from one another to the locked position, as shown in FIGURE 11. This insures proper seating of the beads on tire ring members 52 and 56. The necessary mechanism to accomplish the above is as follows:

When the upper and lower chuck rings engage, as shown in FIGURE 10, the action of cam 88 on switch arm 90 starts a timer (not shown) and also actuates a valve (not shown) which permits air to pass through connection 140 to a cylinder enclosing a spring-loaded piston 141. A piston rod 108 secured to the piston 141 is positioned to engage an arm 110 associated with an electrical switch 112 when the piston is raised. Upward movement of the piston actuates a locking plate 142 and also causes the rod 108 to engage the arm 110, which actuates the switch 112. The actuation of the switch 112 through a valve (not shown) causes the tire 84 to be inflated to a predetermined pressure through the connection 143. The force on the rings 52, 56 due to the internal pressure of the tire 84 is greater than the force on the ring 52 due to pressure in the cylinder 42. This permits the upper and lower rings to separate against the locks 142, as shown in FIGURE 11. Because the locks 142 cannot be in the locking position shown in FIGURES 10, 11 until the piston 141 is raised, and because the switch 112 cannot be operated to inflate the tire until the piston is raised, the tire cannot be inflated before the chuck is securely and positively locked. The switch 112 and its related mechanism forms means responsive to the locking of the chuck for inflating the tire. This provides a desirable safety arrangement.

At the end of the allotted post-inflating time, the air is released from both the tire 84 and the spring-loaded piston 141 by the previously-mentioned timer. When the separating force between the rings 52 and 56 due to pressure in the tire becomes less than the force urging the ring 52 upward due to pressure in the power cylinder 42, the lower ring 52 moves upward from the FIGURE 11 position to the FIGURE 10 position. This permits the corner of the lock 142 to clear the locking surface on the lower chuck ring 52 and this permits the piston rod 141 to retract, thereby rotating plate 142 to unlock the chuck. With the downward movement of the piston rod 108, the arm 110 returns to a normal position, releasing switch 112, which reverses the action of power cylinder 42 to lower the processed tire onto the conveyor. This method of unlocking assures proper release of the mechanism and eliminates damage caused by attempting to lower the chuck before the tire is deflated. The construction of this locking mechanism is more fully described in copending application, Serial No. 797,705, filed March 6, 1959 (file 2758).

Referring to FIGURES 5 and 6 it will be noted that the yoke 46 when lowered engages a valve pusher 100 and depresses it against the resistance of a spring 102 to operate a valve 104 to maintain the roller gate 64 in the vertical position. When the tires have been positioned in proper relation with respect to the lower tire rings 52 and the yoke 46 moves upwardly, the valve pusher 100 is released whereupon the spring 102 moves the valve pusher 100 upwardly to trip the member 106 of the valve 104 to actuate the double acting power cylinder 76 to move the roller gates 64 to the horizontal position. One the next part of the cycle of operation when the yoke 46 again comes down, after releasing a pair of post-inflated tires the movement of the yoke 46 continues to the lowermost position and there engages the valve pusher 100 thereby compressing the spring 102. This actuates the valve member 104 to energize the power cylinder 76 to move the gate roller member 64 from the horizontal to the vertical position ready to receive another pair of tires.

Our improved post-inflating machine is adapted to receive a wide range of tire sizes. The upright rollers 60 and 62 for positioning the tire laterally in alignment with the tire rings 52 may be adjusted relative to each other to accommodate tires of varying sizes by means of a hand wheel 96 (FIGURES 1a, 2) connected through a shaft 98 having left and right-hand threads thereon. It will be noted that the pairs of guide rollers 32 to 40 are of suitable length, and are positioned radially with reference to the lower tire rings 52, so that they will engage tires 84 of a wide range of sizes.

In operation, a tire is ejected from the molding machine and dropped onto a roller-conveyor adjacent the post-inflating machine. The conveyor is inclined slightly, about 15°, towards the post-inflating machine so that the tire will continue its movement until stopped by the vertically-positioned roller 64. The tire is guided by the vertical rollers 60, 62 into abutment with the roller 64 whereby it is centered over the lower tire ring 52.

The impact of the tire against the roller 64 causes the roller to tilt, thus pivoting the attached arm 78 causing cam 80 to actuate the switch 81. Actuation of switch 81 initiates operation of the cylinder 42 to carry the lower chuck ring and tire upwardly into engagement with the upper tire ring 56. The chuck clamping mechanism is then actuated by the cam 88, as previously described, to clamp the lower and upper tire rings 52, 56 together and after they are securely locked the tire is inflated to the desired pressure for a predetermined time. Upon expansion of the tire, the tire wall contacts a marking device 107. The marking device may simply comprise a raised letter or ring which makes a permanent impression on the soft, warm rubber to indicate that the tire has been processed. A suitable control device, either automatic or manual, is provided to control the pressure/time cycle. It is convenient to utilize a timing device to control this cycle. The timing device is preferably set to a time somewhat less than the time cycle of the curing mold to insure continuous operation of the curing and inflating processes.

At the expiration of the pressure/time cycle, the tire pressure is dissipated and the chuck clamping mechanism released, causing the rod 108 to be retracted. Retraction of the rod 108 operates the switch 112 causing the cylinder 42 to lower the tire ring 52 and tire. The tire bead, which tends to adhere to the upper ring 56, is stripped from the ring by the weight of the tire. The stripping is aided by making the upper bead shelf of lesser diameter than the lower bead shelf. When the lower tire ring and tire reach the conveyor, the tire is caught and stripped from the lower chuck ring by the rollers 32–40 while the chuck half itself passes through the conveyor and past the rollers to its lowermost position beneath the platform.

It will be remembered that the pivotal roller 64 has previously been pivoted from its upright tire-blocking position to a horizontal position as a result of the actuation of the power cylinder 76 by upward movement of the yoke valve pusher 100. When the roller 64 is in its horizontal position, it is parallel to the long roller 40, in back of the long roller 40 and slightly below it, as shown in FIGURES 1 and 2. A conveyor roller 66 is in alignment with the roller 64 and supported on the member 20 as shown in FIGURE 1a. The two rollers 62 and 64, when the roller 64 is horizontal, act as conveyor rollers to assist the tire in moving from the long roller 40 out of the post-inflating machine. The tire is, therefore, free to move over the platform rollers and onto a main take-away conveyor situated adjacent the post-inflation machine. The platform is inclined at a small angle, approximately 15°, toward the take-away conveyor to provide for gravity movement of the tire. After the tire has moved off the platform, the roller 64 is pivoted to its upright tire-blocking position and the device is ready to receive another tire from the curing mold. The upward movement of the roller also acts to push the ejected tire well onto the main conveyor in the direction of tire flow.

It will be noted that time is required to permit stripping of the tire and its subsequent movement off the platform before the roller 64 is returned to its upright position. Sufficient time delay for tire ejection is provided as a result of the time taken by the yoke 46 to travel from the stripping point to the point where its valve pusher 100 actuates the power cylinder 76 to raise the roller 64.

While our invention has been illustrated as applied to the actuation of a pair of tires it will be understood that it may be connected to operate a single tire on either side as desired. Further, it is to be noted that where an operation, as the actuation of a switch, has been described with respect to one-half of the machine the corresponding switch must also be actuated on the other half of the machine before the operation will proceed.

Having thus described our invention, we claim:

1. In a post inflation apparatus having a pair of tire engaging chucks adapted to sealingly engage the beads at opposite sides of a tire, fluid pressure means for moving said chucks toward and away from each other between a fully opened position and a fully closed position, and conveying means operable when said chucks are in their fully opened position for inserting and aligning a tire to be inflated between said chucks and actuating said fluid pressure means to drive said chucks to their fully closed position; the improvement comprising abutment means on the opposed faces of said chucks for establishing the fully closed position of said chucks at a spacing such that the tire beads are axially forced toward each other to insure a seal between the chucks and beads, an axial projection on one of said chucks, means defining a central opening in the other of said chucks adapted to receive said projection to guide said chucks in movement to and from said fully closed position, lock means movably mounted upon said projection and movable from a normally maintained inoperative retracted position to an extended locking position, means operable to move said lock means from its retracted position to its extended position when said chucks are in their fully closed position, a locking shoulder on said other of said chucks adjacent said central opening and engageable with said lock means when in its locking position upon movement of said chucks from said fully closed position to a partially closed position, inflating means operable by movement of said lock means to its locking position for inflating the tire to a pressure sufficient to force said chucks from their fully closed position to said partially closed position against the action of said fluid pressure means, said lock means when engaged with said locking shoulder being operable to prevent further opening of said chucks beyond said partially closed position and said shoulder when engaged with said lock means being operable to prevent movement of said lock means to its inoperative position, means for deflating said tire after a predetermined interval of inflation to permit said fluid pressure means to restore said chucks to their fully closed position, and means operable upon restoration of said chucks to said fully closed position by deflation of said tire for retracting said lock means to permit said fluid pressure means to return said chucks to their fully opened position.

2. In a post inflation apparatus as defined in claim 1; the further improvement wherein said lock means comprises a lock member pivotally mounted on said one of said chucks for pivotal movement wherein one end of said member is shifted between said inoperative and said locking positions, the direction of movement of said one end of said member when moving from said inoperative position to said locking position being opposite to that of opening movement of the other of said chucks whereby the force applied by an inflated tire tending to separate said chucks is applied to said lock member in a direction urging said lock member away from said inoperative position.

3. In a post inflation apparatus as defined in claim 2; the further improvement comprising lock actuating means responsive to movement of said chucks from said fully opened position to said fully closed position for shifting said lock member from its inoperative position to its locking position.

References Cited by the Examiner

UNITED STATES PATENTS

| | | | |
|---|---|---|---|
| 2,291,506 | 7/42 | Shook et al. | 18—17 |
| 2,812,547 | 11/57 | Duerksen et al. | 18—18 |
| 2,824,336 | 2/58 | Weigold et al. | 18—17 XR |
| 2,866,500 | 12/58 | George et al. | |
| 2,978,741 | 4/61 | Soderquist | 18—2 |
| 3,008,180 | 11/61 | Woodhall | 18—2 |
| 3,017,669 | 1/62 | Mikell. | |
| 3,039,839 | 6/62 | Waters et al. | |
| 3,075,237 | 1/63 | Soderquist | 18—2 |

FOREIGN PATENTS 1,266,063  5/61  France.

J. SPENCER OVERHOLSER, *Primary Examiner.*

MICHAEL V. BRINDISI, WILLIAM J. STEPHENSON, *Examiners.*

UNITED STATES PATENT OFFICE
CERTIFICATE OF CORRECTION

Patent No. 3,214,790 November 2, 1965

Robert William Wright et al.

It is hereby certified that error appears in the above numbered patent requiring correction and that the said Letters Patent should read as corrected below.

In the heading to the printed specification, lines 8 and 9, for "Dec. 10, 1939" read -- Dec. 10, 1959 --.

Signed and sealed this 24th day of May 1966.

(SEAL)
Attest:

ERNEST W. SWIDER
Attesting Officer

EDWARD J. BRENNER
Commissioner of Patents